(12) United States Patent
Jablonski

(10) Patent No.: US 10,995,864 B2
(45) Date of Patent: May 4, 2021

(54) BALL ELEMENT FOR A ROTARY VALVE AND METHOD OF MANUFACTURING THE SAME

(71) Applicant: FISHER CONTROLS INTERNATIONAL LLC, Marshalltown, IA (US)

(72) Inventor: Jason Dirk Jablonski, Zimmerman, MN (US)

(73) Assignee: FISHER CONTROLS INTERNATIONAL LLC, Marshalltown, IA (US)

(*) Notice: Subject to any disclaimer, the term of this patent is extended or adjusted under 35 U.S.C. 154(b) by 0 days.

(21) Appl. No.: 15/693,657

(22) Filed: Sep. 1, 2017

(65) Prior Publication Data
US 2019/0072192 A1 Mar. 7, 2019

(51) Int. Cl.
*F16K 5/06* (2006.01)
*B33Y 80/00* (2015.01)
(Continued)

(52) U.S. Cl.
CPC ............ *F16K 5/0636* (2013.01); *B33Y 80/00* (2014.12); *F16K 5/0605* (2013.01);
(Continued)

(58) Field of Classification Search
CPC ........ F16K 5/06; F16K 5/0605; F16K 5/0657; F16K 5/0668; F16K 5/0678;
(Continued)

(56) References Cited

U.S. PATENT DOCUMENTS 3,518,742 A * 7/1970 Krosoczka ............ F16K 27/067
  29/890.125
3,770,016 A * 11/1973 Johnstone ............. F16K 5/0605
  137/625.22

(Continued)

FOREIGN PATENT DOCUMENTS

CN  2711475 Y  7/2005
CN  106246950 A * 12/2016  ............... F16K 5/06
(Continued)

OTHER PUBLICATIONS

International Search Report and Written Opinion, corresponding to International Application No. PCT/US2018/045780, dated Nov. 12, 2018.

(Continued)

*Primary Examiner* — Hailey K. Do
(74) *Attorney, Agent, or Firm* — Marshall, Gerstein & Borun LLP

(57) ABSTRACT

A rotary valve is provided for use in highly corrosive and abrasive applications. The valve includes a valve body defining an inlet, an outlet, and a valve interior in fluid communication with the inlet and the outlet. The valve also includes a ball element disposed within the valve interior via a valve stem to control fluid flow through the valve, and a valve seat to sealingly engage the ball element. The ball element includes a body having an outside portion, a bore disposed through a center portion of the body, and at least one brace disposed between the bore and the outside portion to strengthen the ball element during highly corrosive and abrasive applications of the valve.

16 Claims, 9 Drawing Sheets

(51) Int. Cl.
*F16K 31/60* (2006.01)
*B33Y 10/00* (2015.01)

(52) U.S. Cl.
CPC .......... *F16K 5/0657* (2013.01); *F16K 31/602* (2013.01); *B33Y 10/00* (2014.12)

(58) Field of Classification Search
CPC ...... F16K 5/0207; F16K 5/025; F16K 5/0407; F16K 5/045; F16K 99/0013; F16K 99/0023
USPC ............. 251/315.16, 315.01, 315.02, 315.03
See application file for complete search history.

(56) References Cited

U.S. PATENT DOCUMENTS

| | | | | |
|---|---|---|---|---|
| 3,926,407 A | * | 12/1975 | Forster | F16K 5/204 251/315.07 |
| 4,212,321 A | * | 7/1980 | Hulsey | F16K 5/0615 137/625.32 |
| 5,052,657 A | * | 10/1991 | Winship | F16K 39/06 251/160 |
| 5,236,176 A | * | 8/1993 | Yeh | F16K 5/06 251/315.16 |
| 5,360,036 A | * | 11/1994 | Kieper | F16K 5/0605 137/315.18 |
| 5,979,491 A | * | 11/1999 | Gonsior | F16K 41/026 137/375 |
| 2016/0208933 A1 | | 7/2016 | Cadima | |
| 2017/0211708 A1 | * | 7/2017 | Kim | C23C 28/322 |

FOREIGN PATENT DOCUMENTS

| | | | | |
|---|---|---|---|---|
| GB | 406660 A | * | 2/1934 | ............. B21D 51/08 |
| JP | 3093176 B2 | | 10/2000 | |
| WO | WO-2015105555 A1 | * | 7/2015 | ........... F16K 5/0642 |
| WO | WO-2018/063161 A1 | | 4/2018 | |

OTHER PUBLICATIONS

GCC Examination Report (Office Action) for GCC Patent Application No. 2018/135914 dated Apr. 2, 2020.

* cited by examiner

BALL ELEMENT FOR A ROTARY VALVE AND METHOD OF MANUFACTURING THE SAME

FIELD OF THE DISCLOSURE

The disclosure generally relates to rotary valves and, more specifically, to a ball element for a rotary valve and a method of manufacturing the same.

BACKGROUND OF THE DISCLOSURE

Process control systems often employ rotary valves, such as ball valves, butterfly valves, eccentric-disk valves, eccentric-plug valves, etc., to control the flow of process fluids. Rotary valves typically include a valve trim assembly having a seat disposed in the fluid path and surrounding a flow aperture, and a fluid control element (e.g., a disk, a ball, etc.) disposed in the fluid path and rotatably coupled to the body of the valve via a shaft. To control the flow of fluid through some rotary valves, the position of the fluid control element may be varied from a closed position at which the fluid control element is in sealing engagement with the seat, thereby preventing fluid flow through the flow aperture, to a fully open or maximum flow rate position at which the fluid control element is spaced away from the seat, thereby allowing fluid flow through the flow aperture.

In some rotary valves, the fluid control element is a ball element. The weight of the ball element in a floating ball valve design, for example, directly influences the amount of spring force required to push that ball into a seat to maintain a required seat load and subsequent maximum leak rate. This load results in higher friction of the ball against the seat, resulting in higher torques required to open/close the valve. This is especially important at low pressure drops when there is not much force developed from the pressure drop to assist in pressing the ball element into the seat, for example.

Conventional ball elements of the rotary valves are not very elastic, which prevents the ball element from more easily conforming to the shape of a sealing surface of the valve seat, for example. This is particularly a problem in metal ball or metal seat seals, for example. In addition, temperature variations of various operating environments of the valve often cause the shape of the ball element and valve seat to change, making it more difficult for the existing ball elements to sealingly engage the valve seat in an effective manner.

SUMMARY

In accordance with a first exemplary aspect, a rotary valve comprises a valve body defining a valve inlet, a valve outlet, and a control passage in fluid communication with the valve inlet and the valve outlet. A ball element is disposed within the control passage via a valve stem to control fluid flow between the valve inlet and the valve outlet. The ball element includes a body having an outer portion, a bore disposed in a center portion of the body, and at least one brace disposed in the body between the bore and the outer portion of the ball element. A valve seat is disposed in the control passage proximate to the valve inlet and sealingly engages the ball element. Upon rotation of the ball element, the bore of the ball element may be moved from a closed position to an open position, in which the bore of the ball element is exposed to the control passage, allowing fluid flow through the bore.

In accordance with a second exemplary aspect, a method of manufacturing a ball element of a rotary valve comprises forming a body having an outside portion. The method further comprises forming a bore disposed within the body. The method still further comprises forming at least one brace disposed between the body and the bore, the at least one brace disposed one or more of radially from the bore to the outer portion of the body, perpendicular to the bore, parallel to the bore, and/or the at least one brace formed by variations in thicknesses of the body at one or more of the outer portion and the bore.

In further accordance with any one or more of the foregoing first or second exemplary aspects, the ball element may further comprise one or more of a slot or recess for receiving the valve stem. In addition, the at least one brace may include a plurality of braces and each brace of the plurality of braces may include a radial brace. Each radial brace may have a first portion extending to the bore and a second portion in contact with the outer portion of the ball element. Further, each radial brace may be spaced equidistantly from each of the other braces around the bore.

In another aspect, the at least one brace may be disposed parallel to the bore. In yet another form, the at least one brace may be disposed perpendicular to the bore. In addition, the at least one brace may be spaced equidistantly from each of the other braces.

Further, the at least one brace may include a plurality of braces having at least one brace. The at least one brace may have a first thickness T1 and be disposed between a slot for receiving a shaft and the bore. The plurality of braces may further include a second brace having second thickness T2 and disposed between an aperture and the outer portion of the ball element. Further, a third brace may have a third thickness T3 and be disposed between the aperture and the bore, and a fourth brace may have a fourth thickness T4 and be disposed between two apertures, wherein the first thickness T1 may be greater than the second, third, and fourth thicknesses, T2, T3, and T4. In addition, the fourth thickness T4 may be greater than the second and third thicknesses, T2 and T3, resulting in braces having various thicknesses around the ball element.

In accordance with other aspects, the at least one brace may include at least one integral radial brace and the body of ball element may have varying thicknesses around one or more of the slot, the outer portion of the ball, and the bore. In addition, the body of the ball element may include at least one area perpendicular to the bore that is thicker than other areas of the body. In addition, the at least one brace may include a plurality of braces, and the braces of the plurality of braces may be disposed one or more of radially from the bore to the outer portion of the ball element, parallel to the bore, perpendicular to the bore, or any combination thereof.

In one preferred form, forming the body may comprise creating the body using one of an additive manufacturing technique, a casting technique or a sintering technique. In addition, forming the bore within the body may comprise creating the bore within the body using one or more of an additive manufacturing technique, a casting technique, or a sintering technique. Further, forming at least one brace within the body may comprise creating the at least one brace within the body using one or more of an additive manufacturing technique, a casting technique, or a sintering technique.

In another aspect, the additive manufacturing technique may comprise 3D printing. In addition, the method may further comprise forming one of a slot or a recess in an outer portion of the body of the ball, one of the slot or the recess for receiving the valve stem.

In accordance with other aspects, the method may further comprise applying a coating to the outside portion of the body one of: (1) after fabrication of the ball element; or (2) during fabrication using an additive manufacturing technique. In addition, forming one or more of the body, the bore and the at least one brace may comprise forming one or more of the body, the bore and the at least one brace by one or more of casting or sintering and then joining one or more of the body, the bore and the at least one brace by fabrication. Further, one or more of the body and the braces may be fabricated out of sheet, machined bar, or plate.

BRIEF DESCRIPTION OF THE DRAWINGS

The features of this invention which are believed to be novel are set forth with particularity in the appended claims. The invention may be best understood by reference to the following description taken in conjunction with the accompanying drawings, in which like reference numerals identify like elements in the several FIGS., in which:

DETAILED DESCRIPTION

The present disclosure is directed to a braced ball element for a rotary valve. The rotary valve includes a valve body defining a valve inlet, a valve outlet, and a control passage in fluid communication with the valve inlet and the valve outlet. The ball element is disposed within the control passage via a valve stem to control fluid flow between the valve inlet and the valve outlet and includes a body having an outer portion. A bore is disposed in a center portion of the body, and at least one brace is disposed in the body between the bore and the outer portion of the ball element. The at least one brace may include a plurality of braces and may be disposed one or more of radially from the bore to the outer portion of the ball element, parallel to the bore, perpendicular to the bore, or any combination thereof. Further, the at least one brace may include at least one integral radial brace, such that the body of the ball element may have varying thicknesses around one or more of the slot, the outer portion of the ball, and the bore. So configured, the hollow, braced ball element is more elastic than the conventional solid ball element, allowing the ball element to more easily conform to the shape of a sealing surface. In addition, the hollow ball element reduces the weight of the ball element, reducing an amount of spring force required to push the ball element into a valve seat to maintain a required seat load and subsequent maximum leak rate.

Figure 1A:
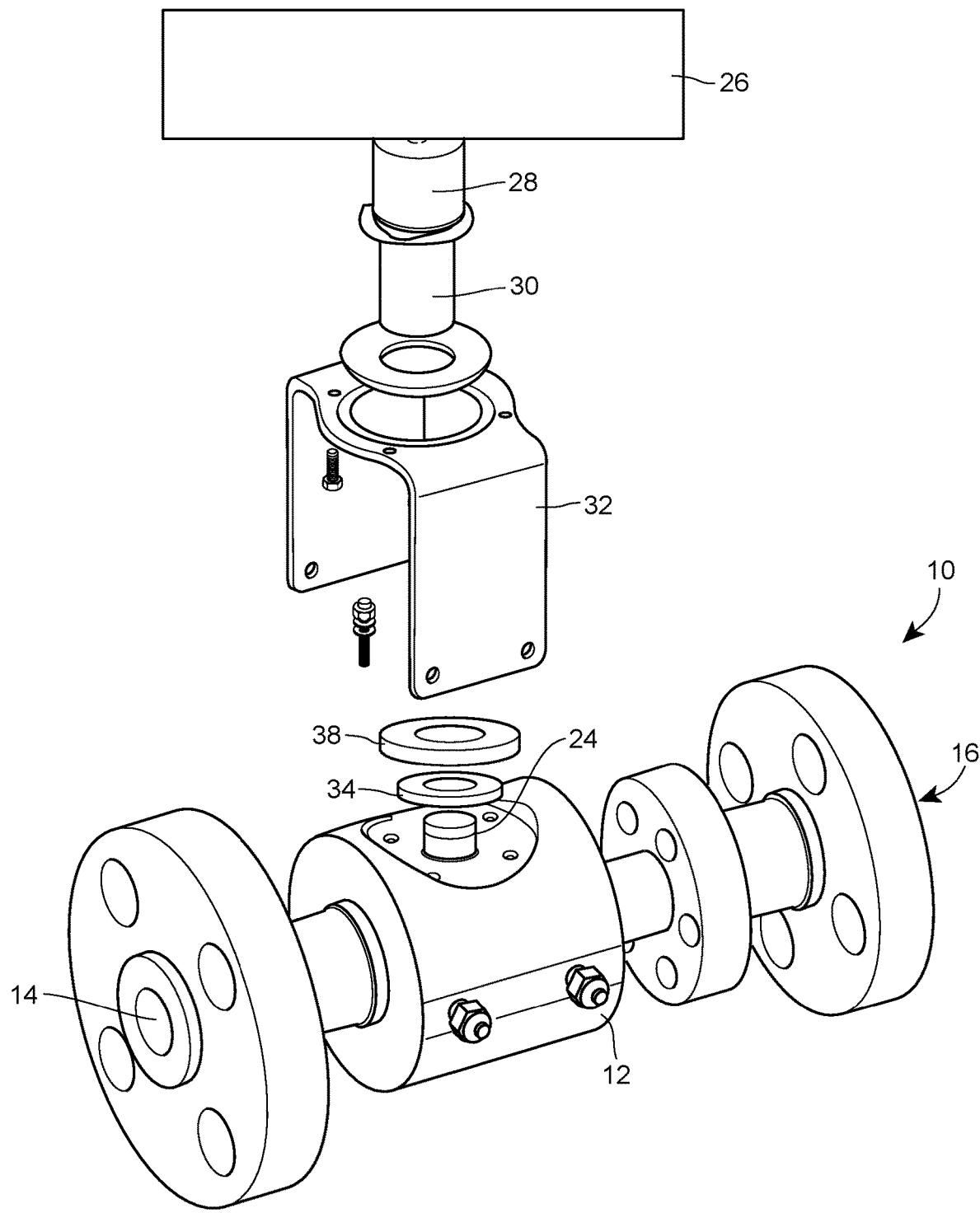
FIG. 1A is a partially exploded, perspective view of an exemplary rotary valve in accordance with the teachings of the present disclosure.
Figure 1B:
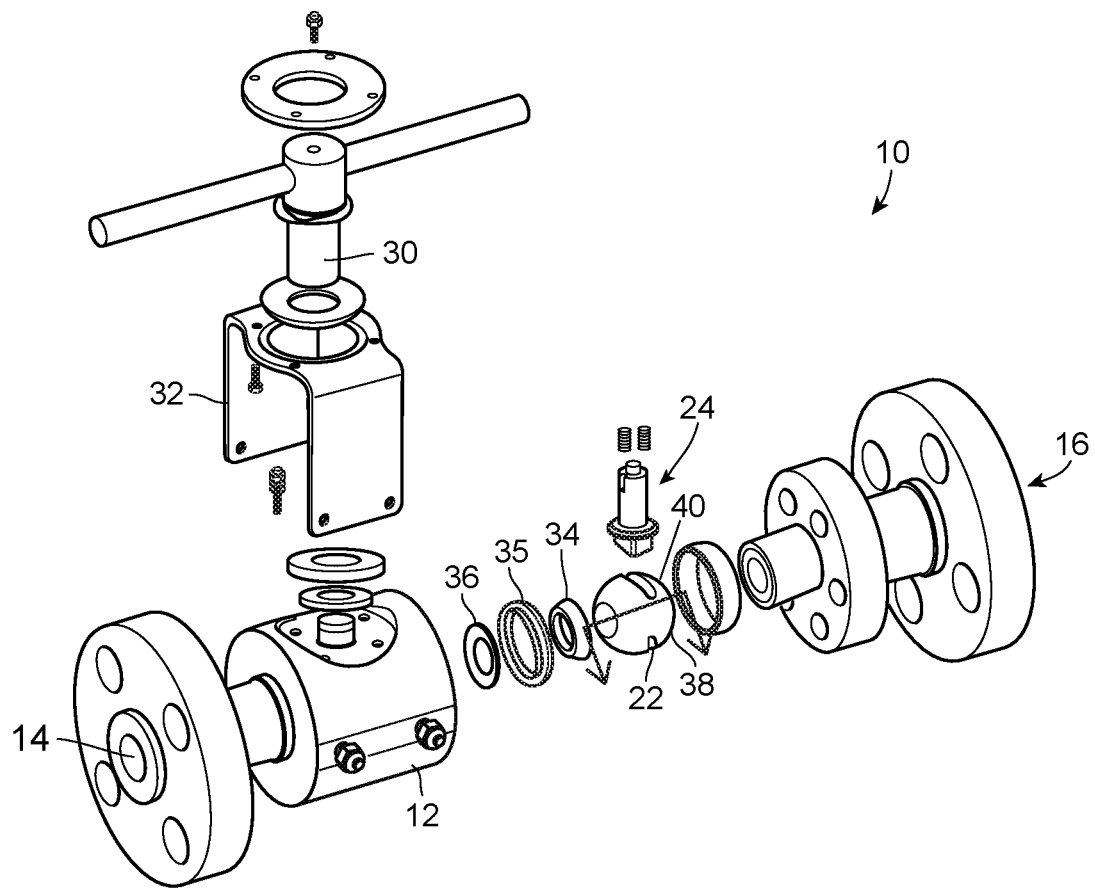
FIG. 1B is an exploded view of the exemplary rotary valve of FIG. 1, with a ball element in accordance with the teachings of the present disclosure.
Figure 2:
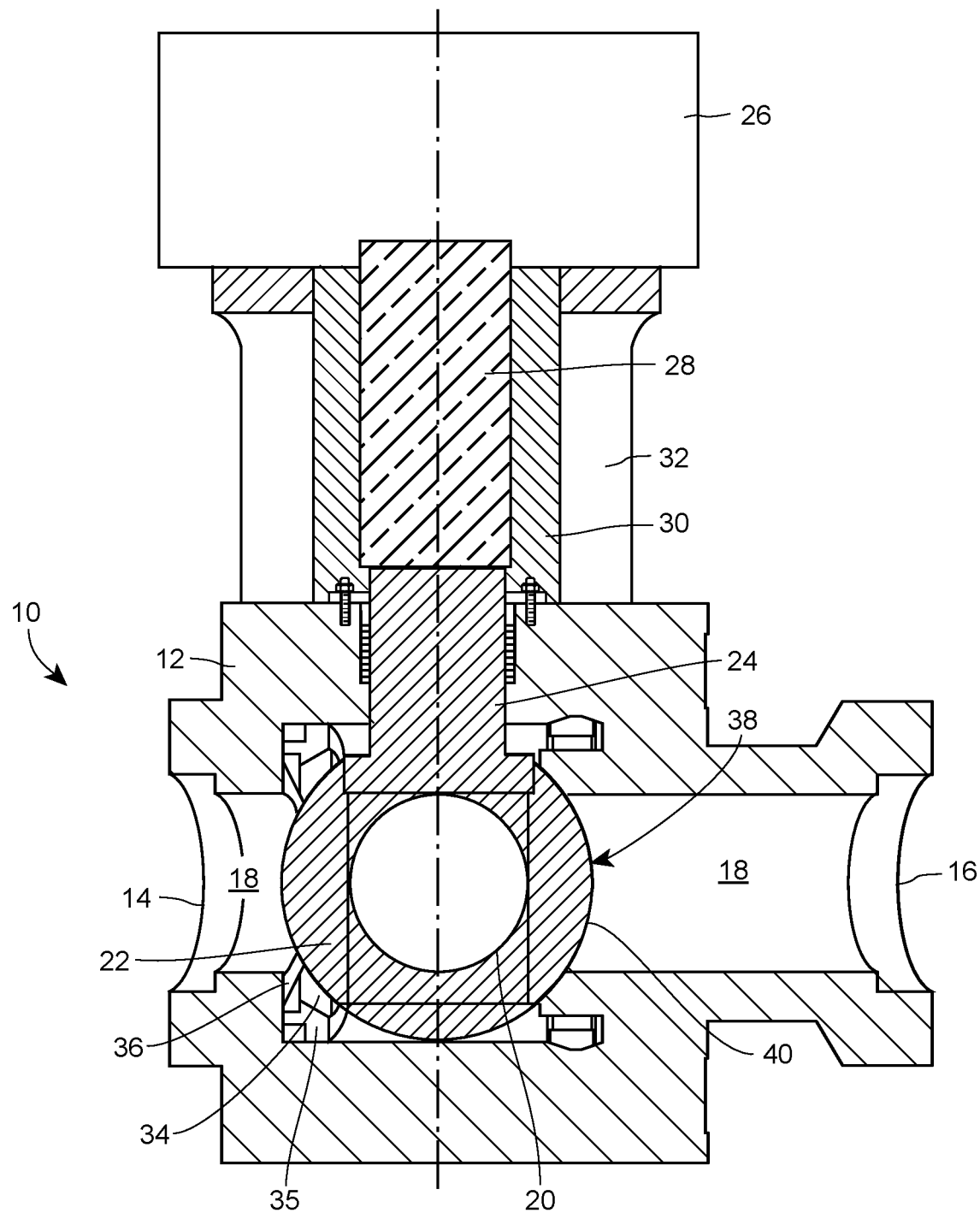
FIG. 2 is a cross-sectional view of the exemplary rotary valve constructed in accordance with the teachings of the present disclosure.

Referring now to FIGS. 1A, 1B, and 2, an exemplary rotary valve 10 of the type commonly employed in process control systems is depicted. The control valve 10 includes a valve body 12, a valve inlet 14, a valve outlet 16, and a flow path 18 that extends between the inlet 14 and the outlet 16. The flow path 18 includes a control passage 20, and a control element 22 is movably disposed in the control passage 20. In the example of FIGS. 1A, 1B and 2, the control element 22 in the control valve 10 takes the form of a rotating control element and includes a new ball element 22 of the present disclosure.

More specifically, the control element 22 of FIGS. 1B and 2 is a floating ball element connected to a valve stem 24, such as a rotary stem. The valve stem 24 is operatively coupled to an actuator 26 by an actuator shaft 28, and the actuator 26 may be any kind of suitable actuator of the types commonly employed in the art. The ball element 22 is positioned such that the floating ball is disposed in the control passage 20. Using the actuator 26, the position of the control element 22 within the control passage 20 may be controlled, thereby controlling the amount of fluid flow through the control passage 20. The floating ball valve stem 24 may be supported by a shaft adapter 30 and a side-mounted bracket 32, which operatively attaches the actuator 26 and the valve body 12.

Still referring to FIGS. 1B and 2, a valve seat 34 is disposed in the control passage 20 proximate to the valve inlet 14 and sealingly engages the ball element 22. A valve seat holder 35 for receiving the valve seat 34 is also disposed proximate to the valve inlet, and a spring 36, such as a Belleville spring, is disposed upstream the valve seat holder 35 to bias the ball element 22 in the closed position, as depicted in FIG. 2, for example. The ball element 22 includes a body 38 having an outer portion 40, a bore 42 disposed in a center portion C of the body 38, and at least one brace disposed in the body 38 between the bore and the outer portion 40 of the ball element 22, as described more below. Upon rotation of the ball element 22, the bore 42 of the ball element 22 may be moved from a closed position to an open position, in which the bore 42 of the ball element 22 is exposed to the control passage 20, allowing fluid flow through the bore 42, for example.

Figure 3:
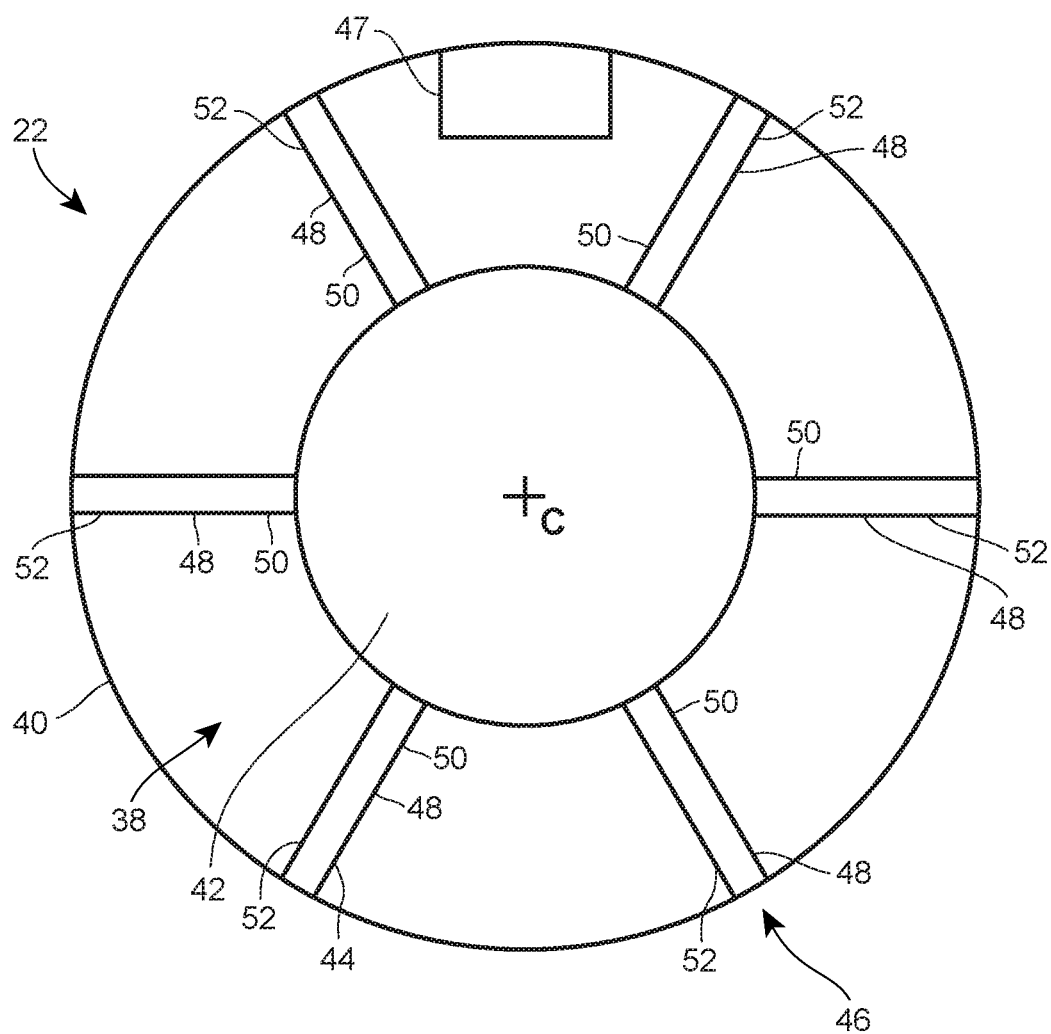
FIG. 3 is a cross-sectional view of an exemplary ball element of a rotary control valve constructed in accordance with the teachings of the present disclosure.

Referring now to FIG. 3, a cross-sectional view of the ball element 22 of FIGS. 1B and 2 is depicted. As shown therein, the ball element 22 includes the body 38 having an outer portion 40, a bore 42 disposed in a center portion C of the body 38, and at least one brace 44 disposed in the body 38 between the bore 42 and the outer portion 40 of the ball element 22. More specifically, in this example, the at least one brace 44 includes a plurality of braces 46, as explained more below. In addition, one or more of a slot 47 or recess for receiving the valve stem 24 is disposed within the ball element 22, as depicted in FIG. 3.

In the example ball element 22 of FIG. 3, the at least one brace 44 includes the plurality of braces 46, and each brace 44 of the plurality of braces 46 includes at least one radial brace 48. Each radial brace 48 includes a first portion 50 extending to the bore 42 and second portion 52 in contact with the outer portion 40 of the ball element 22. In addition, each radial brace 48 is spaced equidistantly from the other radial brace 48 of the plurality of braces 46 extending around the bore 42 of the ball element 22. While the braces 44, 48 are depicted in FIG. 3 as generally cylindrical in shape, one of ordinary skill in the art will appreciate that one or more of the braces 44, 48 may alternatively include various other shapes, such as one or more of triangular, triangular-in part, circular, circular-in part, and/or spherical shapes, and still fall within the scope of the present application. In addition, one or more of the braces 44, 48 may additionally and/or alternatively have a thicker and/or different cross-sectional width, for example, than depicted in FIG. 3 and also still fall within the scope of the present disclosure.

Figure 4:
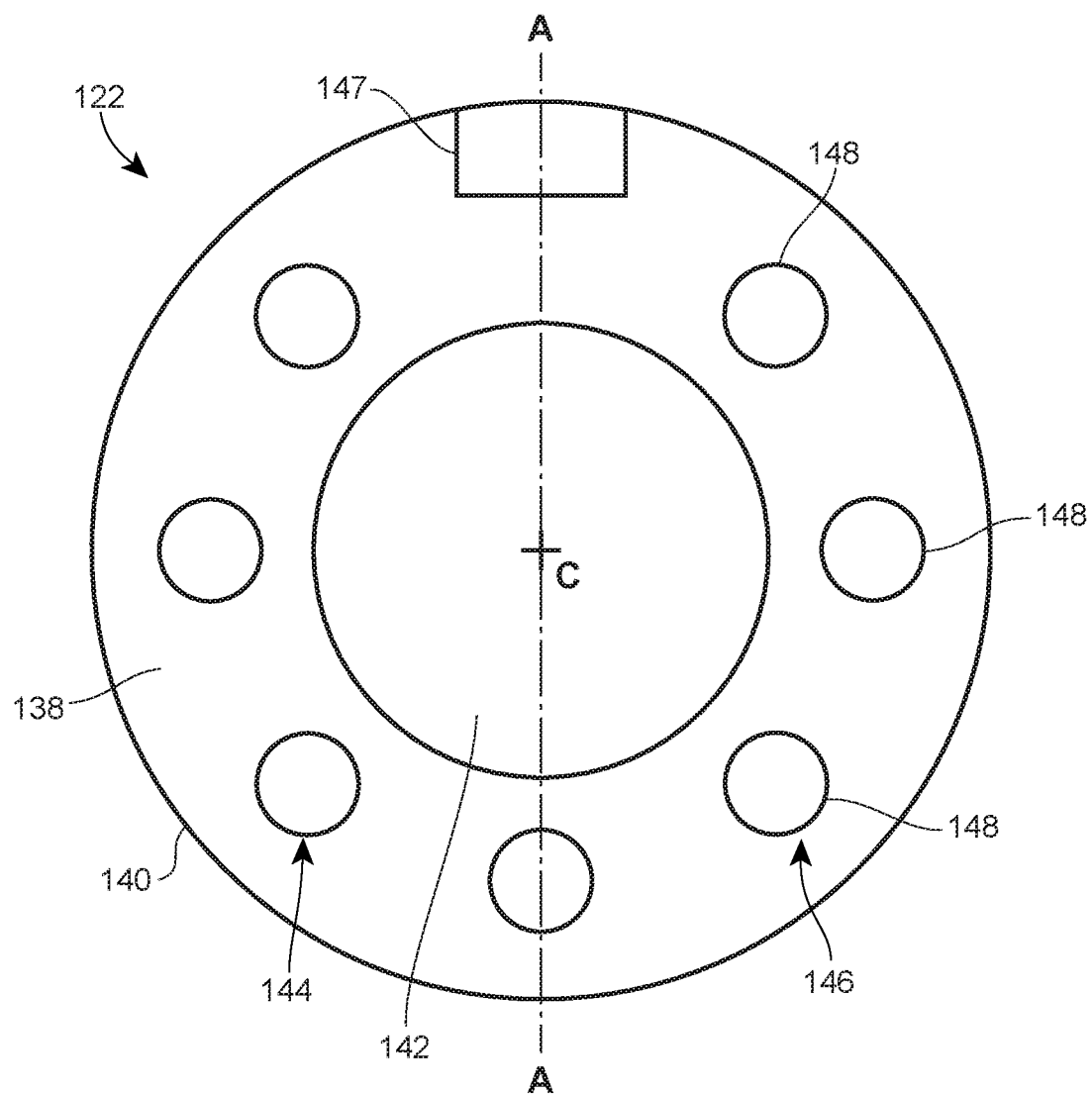
FIG. 4 is a cross-sectional view of another exemplary ball element of a rotary valve constructed in accordance with the teachings of the present disclosure.

Referring now to FIG. 4, a cross-sectional view of another exemplary ball element 122 of the present disclosure is depicted. The ball element 122 may replace the ball element 22 and/or alternatively be used with the rotary valve 10 of FIGS. 1A, 1B and 2. Parts of the ball element 122 the same or similar to the ball element 22 of FIG. 3 are numbered 100 more than the parts of the ball element 22.

Like the ball element 22, the ball element 122 includes the body 138 having an outer portion 140, a bore 142 disposed in a center C of the body 38, and at least one brace 144 disposed in the body 138 between the bore 142 and the outer portion 140 of the ball element 122. More specifically, in this example, the at least one brace 144 include a plurality of braces 146, as explained more below. In addition, one or more of a slot 147 or recess for receiving the valve stem 24 is disposed within the ball element 122, as depicted in FIG. 3.

Unlike the plurality of braces 44 of FIG. 3, however, the plurality of braces 146 of FIG. 4 are each disposed parallel to the bore 142. In addition, each brace 144 is spaced equidistantly from the other braces 148 of the plurality of braces 146 extending around the bore 142 of the ball element 122. While the braces 144, 148 are depicted in FIG. 4 as generally cylindrical in shape, one of ordinary skill in the art will appreciate that one or more of the braces 144, 148 may alternatively include various other shapes, such as one or more of triangular, triangular-in part, circular, circular-in part, and/or spherical shapes, and still fall within the scope of the present application. In addition, one or more of the braces 144, 148 may additionally and/or alternatively have a thicker and/or different cross-sectional width, for example, than depicted in FIG. 4 and also still fall within the scope of the present disclosure.

Still further, while the plurality of braces 146 of FIG. 4 includes seven braces 148, more or fewer braces 148 may alternatively be used and still fall within the scope of the present disclose. For example, and in one example, only a pair of braces may be included within the ball element 122, and the pair of braces may be disposed on either side of the center C of the ball element 122 and along an axis perpendicular to a longitudinal axis A of the ball element 122, for example. More generally any number of braces 148 disposed parallel to the bore 142 may alternatively be used, such as more than a pair of braces or any number less than seven braces, in one example.

Figure 5:
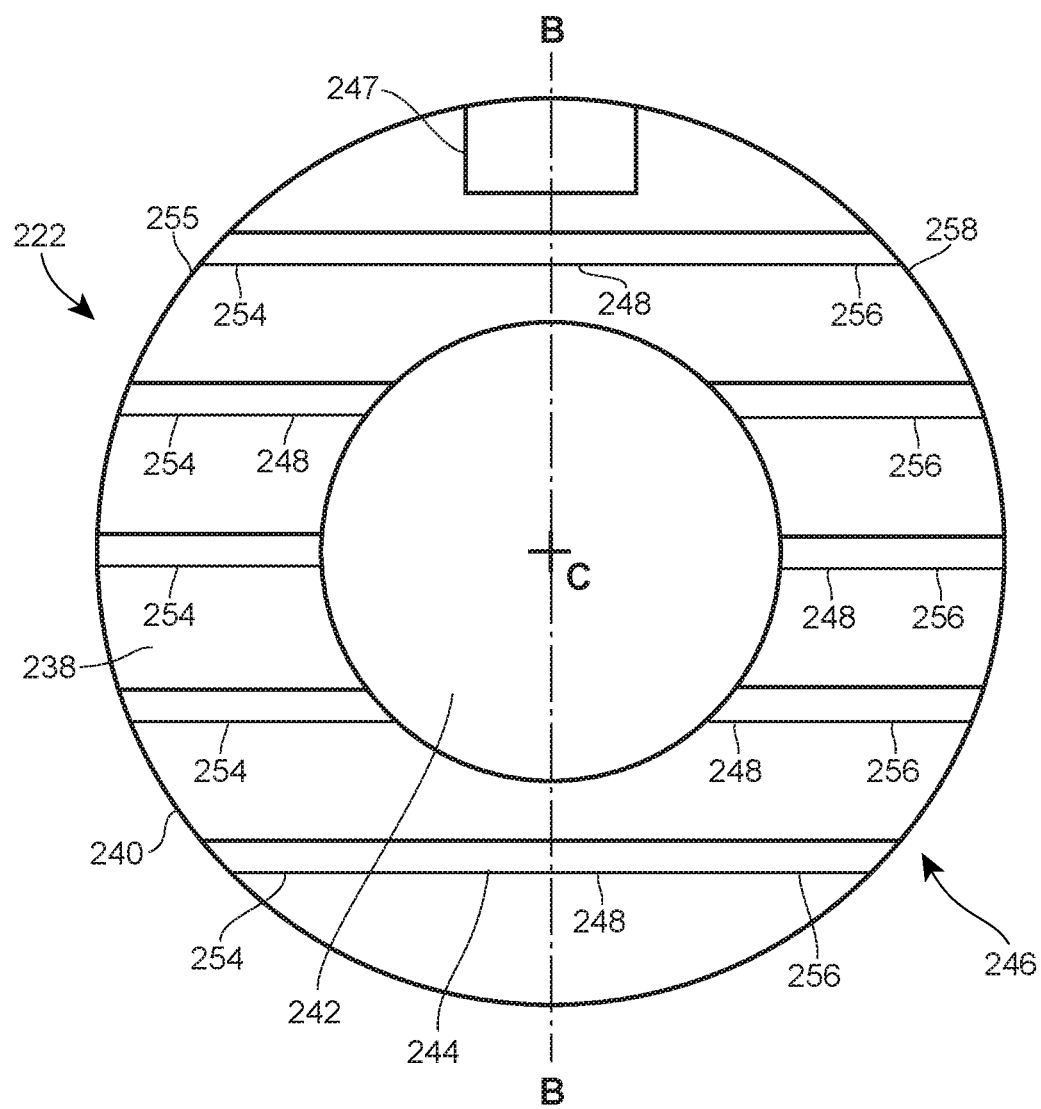
FIG. 5 is a cross-sectional view of yet another exemplary ball element of a rotary valve constructed in accordance with the teachings of the present disclosure.

Referring now to FIG. 5, a cross-sectional view of another exemplary ball element 222 of the present disclosure is depicted. The ball element 222 may replace the ball element 22 and/or alternatively be used with the rotary valve 10 of FIGS. 1A, 1B and 2. Parts of the ball element 222 the same or similar to the ball element 22 of FIG. 3 are numbered 200 more than the parts of the ball element 22.

Like the ball element 22, the ball element 222 includes a body 238 having an outer portion 240, a bore 242 disposed in a center C of the body 238, and at least one brace 244 disposed in the body 238 between the bore 242 and the outer portion 240 of the ball element 222. More specifically, in this example, the at least one brace 244 includes a plurality of braces 246, as explained more below. In addition, one or more of a slot 247 or recess for receiving the valve stem 24 is disposed within the ball element 222, as depicted in FIG. 5.

Unlike the plurality of braces 44 of FIG. 3, however, the plurality of braces 244 of FIG. 5 are each disposed perpendicular to the bore 242. In addition, each brace 244 is spaced equidistantly from the other braces 248 of the plurality of braces 246 extending around the bore 242 of the ball element 222. While the braces 244, 248 are depicted in FIG. 5 as generally cylindrical in shape, one of ordinary skill in the art will appreciate that one or more of the braces 244, 248 may alternatively include various other shapes and still fall within the scope of the present application. In addition, one or more of the braces 244, 248 may additionally and/or alternatively have a thicker and/or different cross-sectional width, for example, than depicted in FIG. 5 and also still fall within the scope of the present disclosure.

Still further, while the plurality of braces 246 of FIG. 4 includes five braces 248, more or fewer braces 248 may alternatively be used and still fall within the scope of the present disclose. For example, and in one example, only a pair of braces may be included in the ball element 122, such as the pair of braces disposed on either side of the center C of the ball element 222 and along an axis perpendicular to a longitudinal axis B of the ball element 222. More generally, any number of braces 248 disposed perpendicular to the bore 242 may alternatively be used, such as more than a pair of braces or any number less than seven braces, in one example.

Still referring to FIG. 5, the at least one brace 244 or each brace 248 of the plurality of braces 246 includes a first end 254 adjacent to a first area 255 of outer portion 240 of the ball element 222 and a second end 246 adjacent to a second area 258 of the outer portion 240 of the ball element 222. In one example, the second area 258 is disposed on a side of the ball element 222 opposite to the first area 255 of the outer portion 240. In a similar manner, each of braces 248 also includes a first end 254 and a second end 256. The second end 256 is disposed on a side of the ball element opposite to a side of the ball element 222 of the first end 254 of the brace 248.

Figure 6:
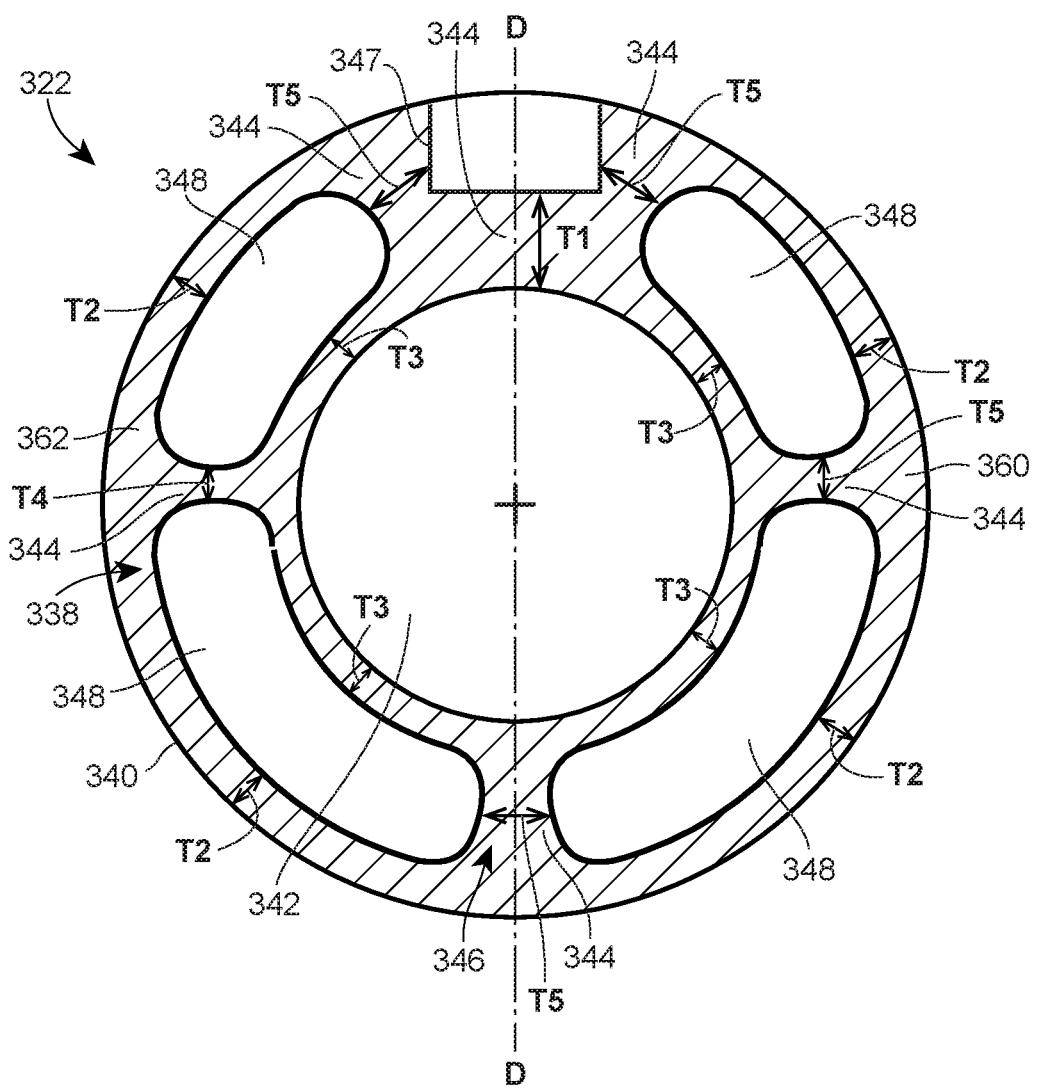
FIG. 6 is a cross-sectional view of yet another exemplary ball element of a rotary valve constructed in accordance with the teachings of the present disclosure.

Referring now to FIG. 6, a cross-sectional view of another exemplary ball element 322 of the present disclosure is depicted. The ball element 322 may replace the ball element 22 and/or alternatively be used with the rotary valve 10 of FIGS. 1A, 1B and 2. Parts of the ball element 322 the same or similar to the ball element 22 of FIG. 3 are numbered 300 more than the parts of the ball element 22.

Like the ball element 22, the ball element 322 includes a body 338 having an outer portion 340, a bore 342 disposed in a center C of the body 338, and at least one brace 344 disposed in the body 338 between the bore 342 and the outer portion 340 of the ball element 322. More specifically, in this example, the at least one brace 344 may include a plurality of braces 346, as explained more below. In addition, one or more of a slot 347 or recess for receiving the valve stem 24 may be disposed within the ball element 322, as depicted in FIG. 6.

Unlike the plurality of braces 46 of FIG. 3, however, the plurality of braces 346 of FIG. 6 are integral braces 344, such as integral radial braces, disposed around the bore 340 between the outer portion 340 of the ball element 322 and the bore 342. More specifically, ball element 322 further includes a plurality of apertures 348 disposed around the bore 342 between the outer portion 340 of the ball element 322 and the bore 342. In one example, the braces 344 are disposed between one or more of the apertures 348, and, thus, also between the outer portion 340 and the bore 342. In addition, each aperture 348 may have a different shape and size of another aperture 348 of the plurality of apertures 348 For example, and as depicted in FIG. 6, the plurality of apertures 348 includes four apertures 348. Two of the four apertures 348 are disposed within an area below a center C of the ball element 322 and include a first size, while the other two apertures 348 are disposed within an area of the ball element 322 above the center C depicted in FIG. 6 and include a second size smaller than the first size. Said another way, the body 338 of the ball element 322 is separated into two halves, a first half 360 and a second half 362. The first half 360 includes an aperture 348 having a first size and another aperture 348 having a second size. Likewise, the second half 362 includes an aperture 348 having of the first size and another aperture 348 having the second size, such that the two apertures 348 disposed on the second half 362 of the body 338 of the ball element 322 are the same as the two apertures 348 disposed on the first half 360 of the body 338 of the ball element 322. So configured, the body 338 of the ball element 322 includes braces 344 disposed between the various apertures 348, the braces 344 having different thicknesses around one or more of the slot 347, the outer portion 340 of the ball element 322, and the bore 342, as explained more below More specifically, and in one example, the body 338 of the ball element 322 has a brace 344, such as a first brace, having a first thickness T1 and disposed between the slot 347 and the bore 342, and another brace 344, such as second brace, having a second thickness T2 and disposed between the aperture 348 and the outer portion 340 of the ball element 322. In addition, the body 338 may also include a third brace 344 having a third thickness T3 and disposed between the aperture 348 and the bore 342 and a fourth brace 344 having fourth thickness T4 and disposed between the two of the apertures 348. Further, in other examples, the body 338 of the ball element 322 may include other braces 344, such as a fifth brace, having a fifth thickness T5 and disposed between the slot 347 and an adjacent aperture 348 disposed in the body 338 around the outer portion 340 of the bore 342, for example. In one example, the first thickness T1 of the brace 344 is greater than the second, third, and fourth thicknesses T2, T3 and T4, of the corresponding braces 344, and the fourth thickness T4 of the brace 344 is greater than the second and the third thicknesses T2, T3, of the corresponding braces 344, resulting in various thicknesses of braces 344 in the body 338 disposed around the ball element 322. As one of ordinary skill in the art will understand, additional thicknesses of braces 344 of the body 338 not indicated may be disposed within the body 338. Further, in other examples, the number, shapes, and sizes of the apertures 348 may vary from that depicted in FIG. 6, affecting the thicknesses T1-T5 of corresponding braces 344. For example, in another example, and depending upon the number, size and shape of the apertures 348 within the body 338 of the ball element 322, the first thickness T1 may be less than one or more of the second, third, fourth, and fifth thicknesses T2, T3, T4, T5 and still fall within the scope of the present disclosure.

Figure 7:
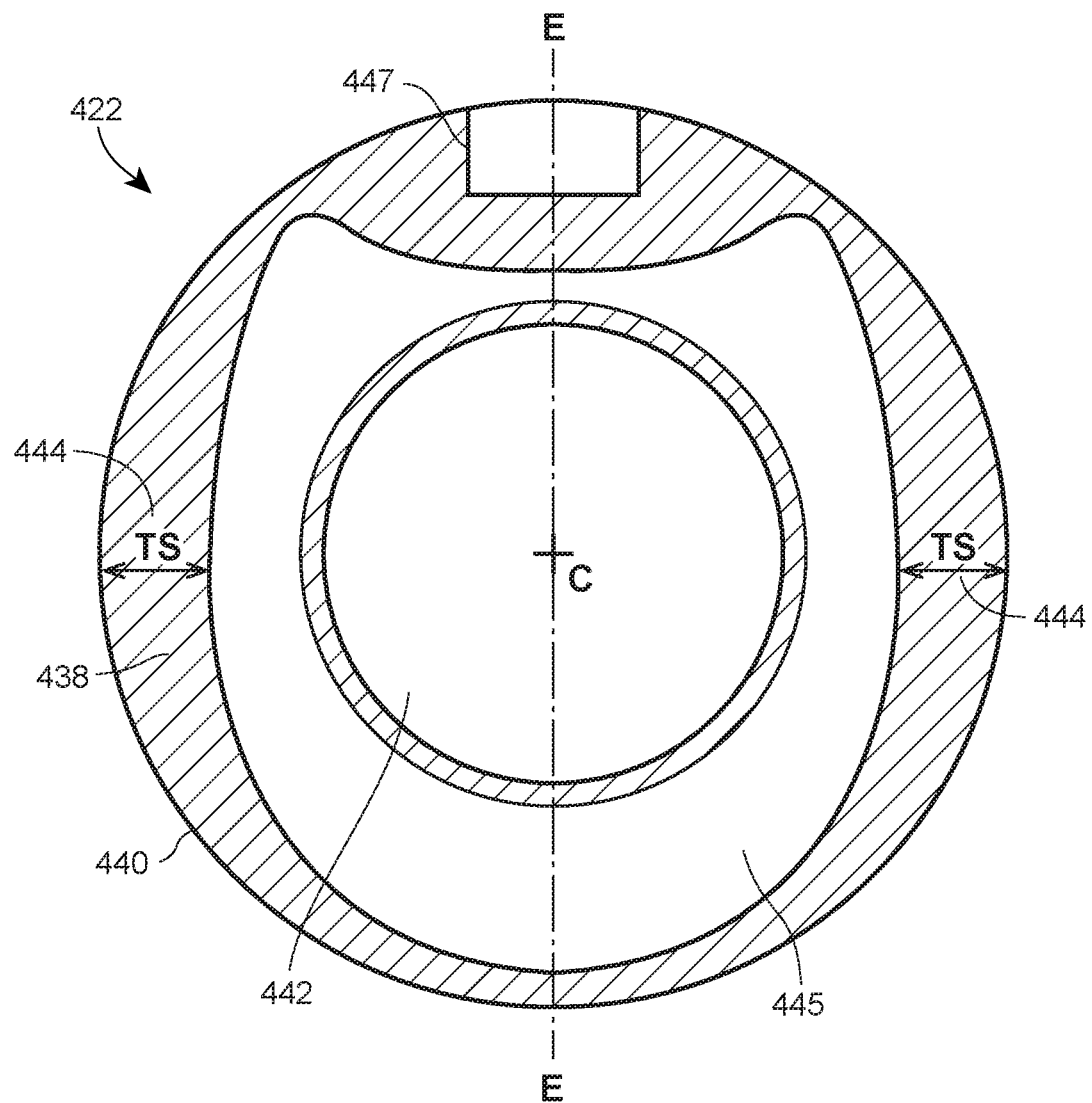
FIG. 7 is a cross-sectional view of yet another exemplary ball element of a rotary valve constructed in accordance with the teachings of the present disclosure.

Referring now to FIG. 7, a cross-sectional view of another exemplary ball element 422 of the present disclosure is depicted. The ball element 422 may replace the ball element 22 and/or alternatively be used with the rotary valve 10 of FIGS. 1A, 1B and 2. Parts of the ball element 422 the same or similar to the ball element 22 of FIG. 3 are numbered 400 more than the parts of the ball element 22.

Like the ball element 22, the ball element 422 includes the body 438 having an outer portion 440, a bore 442 disposed in a center C of the body 438, and one or more of a slot 447 or recess for receiving the valve stem 24 is disposed within the ball element 422, as depicted in FIG. 7. However, unlike the ball element 22 of FIG. 3 and the other foregoing examples, the ball element 422 includes at least one brace 444 disposed in a thicker section TS of the body 438 that is perpendicular to the bore 442. Said a different way, and as depicted in FIG. 7, the at least one brace 444 disposed in the thicker section TS is perpendicular to a longitudinal axis E of the bore 442. In other words, the body 438 includes at least one brace 444 in the area TS that is perpendicular to the bore 442 that is thicker than other areas of the body 438. The at least one brace 444 in the thicker section TS essentially braces the ball element 422 during use. Said another way, the thicker section TS may be and/or serve the same function as the at least one brace of the foregoing previous examples, in that the thicker section reinforces the body 438 due to potential structural weakness from the bore 442, for example. In this way, the at least one brace 444 in the thicker section TS of the ball element 422 helps the ball element 422 maintain rigidity and structural integrity when the ball element 422 is pressed or pushed into the valve seat 34 of the valve 10 (FIGS. 1B and 3).

In view of the foregoing, one of ordinary skill in the art will appreciate several advantages of the ball elements 22, 122, 222, 322, and 422 of the present disclosure. For example, each of the at least one brace 44, 144, 244, 344, 444 serves to reinforce the ball elements 22, 122, 222, 322, and 422 having the bores 42, 142, 242, 342, 442 disposed therein. Said another way, the bores 42, 142, 242, 342, 442 are reinforced by one or more of the at least one brace 44, 144, 244, 344, 444, in particular when the ball element 22, 122, 222, 322, 422 sealingly engages the valve seat 34 (FIGS. 1B and 2) during operation of the rotary valve 10. The shape, size and location of the braces, such as the at least one brace 44, 144, 244, 344, 444, may be modified to adjust flexibility and/or rigidity of the ball element 22, 122, 222, 322, 422, as needed. For example, and in one example, the at least one brace 44, 144, 244, 344, 444 includes the plurality of braces 46, 146, 246, 346, and the braces 44, 144, 244, 344, 444 of the plurality of braces 46, 146, 246, 346 may be disposed one or more of: (1) radially from the bore 42, 142, 242, 342 to the outer portion 40, 140, 240, 340 of the ball element 22, 122, 222, 322; (2) parallel to the bore 42, 142, 242, 342; (3) perpendicular to the bore 42, 142, 242, 342; and/or (4) any combination thereof.

Figure 8:
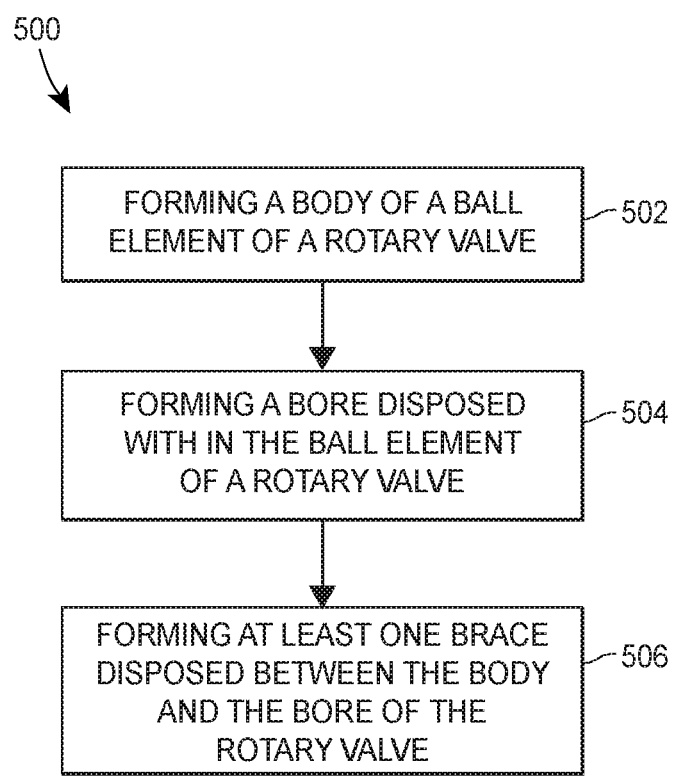
FIG. 8 is a flow chart depicting an exemplary method according to an aspect of the present disclosure.

Referring now to FIG. 8, a diagram of an example method or process 500 of manufacturing the ball element 22, 122, 222, 322, 422 of the rotary valve 10 according to the teachings of the present disclosure is depicted. More specifically, the method of manufacturing 500 includes the act 502 of forming the body 38, 138, 238, 338, 438 of the ball element 22, 122, 222, 322, 422 of the rotary valve 10. The method 500 further includes the act 504 of forming the bore 42, 142, 242, 342, 442 disposed within the ball element 22, 122, 222, 322, 422, and the act 506 forming at least one brace 44, 144, 244, 344, 444 disposed within the body 38, 138, 238, 338.

In one example, each of the acts 502, 504 and 506 of the method of manufacturing 500 use one or more additive manufacturing techniques. Generally, the additive manufacturing technique may be any additive manufacturing technique or process that builds three-dimensional objects by adding successive layers of material on a material. The additive manufacturing technique may be performed by any suitable machine or combination of machines. The additive manufacturing technique may typically involve or use a computer, three-dimensional modeling software (e.g., Computer Aided Design, or CAD, software), machine equipment, and layering material. Once a CAD model is produced, the machine equipment may read in data from the CAD file and layer or add successive layers of liquid, powder, sheet material (for example) in a layer-upon-layer fashion to fabricate a three-dimensional object. The additive manufacturing technique may include any of several techniques or processes, such as, for example, a stereolithography ("SLA") process, a fused deposition modeling ("FDM") process, multi-jet modeling ("MJM") process, a selective laser sintering ("SLS") process, an electronic beam additive manufacturing process, and an arc welding additive manufacturing process. In some embodiments, the additive manufacturing process may include a directed energy laser deposition process. Such a directed energy laser deposition process may be performed by a multi-axis computer-numerically-controlled ("CNC") lathe with directed energy laser deposition capabilities.

In another example, each of the acts 502, 504, 506 of the method of manufacturing 500 may include one or more of casting or sintering, manufacturing processes well known to persons having ordinary skill in the art. In yet another example, each of the acts 502, 504, 506 of the method of manufacturing 500 may further include joining one or more of the body 38, 138, 238, 338, 448, the bore 42, 142, 242, 342, 442, and the at least one brace 44, 144, 244, 344, 444 by fabrication after casting or sintering one or more of the same parts of the ball element 22, 122, 222, 322, 422. More specifically, in one example, one or more of the body 38, 138, 238, 338, 448 and the at least one brace 44, 144, 244, 344 may be fabricated out of sheet or machined bar or plate. Some materials may include one or more of polymers, carbon or alloy steel, stainless steels and exotics. Coating material, such as one or more of chrome, cobalt alloys, carbides, or others, may be applied after fabrication of the ball element 22, 122, 222, 322, 422 or as part of the fabrication process, such as during additive manufacturing, as explained more below. In one example, it is possible to make the ball element 22, 122, 222, 322, 422 completely out of the coating material. In another example, a substitute material different from the coating material may alternatively be used, making the use of the coating material unnecessary, as also explained more below.

More specifically, in some examples, forming the body 38, 138, 238, 338, 438 having the outer portion 40, 140, 240, 340, 440 may comprise creating the body using an additive manufacturing technique, such as one or more of the foregoing additive manufacturing techniques described above. In addition, forming the bore 42, 142, 242, 342, 442 within the body 38, 138, 238, 338, 438 may comprise creating the bore 42, 142, 242, 342, 442 using an additive manufacturing technique, such as one or more of the foregoing additive manufacturing techniques described above. Further, forming the at least one brace 44, 144, 244, 344, 444 within the body 38, 138, 238, 338 may comprise creating the at least one brace 44, 144, 244, 344 within the body 38, 138, 238, 338 using an additive manufacturing technique, such as one or more of the additive manufacturing techniques described above.

In addition, the method of manufacturing 500 may further include forming one or more of the slot 47, 147, 247, 347, 447 or the recess in the outer portion 40, 140, 240, 340, 440 of the body 38, 138, 238, 338, 438 of the ball element 22, 122, 222, 322, 422, one of the slot or recess 47, 147, 247, 347, 447 for receiving the valve stem 24 (FIGS. 1B and 2). In other examples, the method of manufacturing 500 may further comprise applying a coating to the outer portion 40, 140, 240, 340, 440 of the body 38, 138, 238, 338, 438 one of: (1) after fabrication of the ball element 22, 122, 222, 322, 422; or (2) during fabrication of the ball element 22, 122, 222, 322, 422 using at least one additive manufacturing technique.

In still other examples, forming one or more of the body 38, 138, 238, 338, 438 may comprise creating the body 38, 138, 238, 338, 438 using one or more of a casting or a sintering technique. In addition, forming the bore 42, 142, 242, 342, 442 within the body 38, 138, 238, 338, 438 may comprise creating the bore 42, 142, 242, 342, 442 within the body 38, 138, 238, 338, 438 using one or more of a casting or sintering technique. Further, forming the at least one brace 44, 144, 244, 344, 444 within the body 38, 138, 238, 338 may comprise creating the at least one brace 44, 144, 244, 344, 444 within the body 38, 138, 238, 338 using one or more of a casting or a sintering technique. Still further, the method 500 may then further include joining one or more of the body 38, 138, 238, 338, 438, the bore 42, 142, 242, 342, 442, and/or the at least one brace 44, 144, 244, 344, 444 by fabrication.

From the foregoing, one of ordinary skill in the art will appreciate the several advantages of the foregoing ball elements 22, 122, 222, 322, 422 when used in the rotary valve 10 and method 500. For example, the hollow, braced ball elements 22, 122, 222, 322, 422 will be more elastic than a solid ball element, allowing the ball elements 22, 122, 222, 322, 422 to more easily conform to the shape of a mated sealing surface of the valve seat 34, for example. This provides particular benefits when temperature variations cause the shape of the ball element 22, 122, 222, 322, 422 and valve seat 34 to change during operation of the rotary valve 10 or when there is a desire to assemble the rotary valve 10 without a mating process, such as grinding or lapping.

Although certain rotary valves have been described herein in accordance with the teachings of the present disclosure, the scope of coverage of this patent is not limited thereto. On the contrary, while the invention has been shown and described in connection with various preferred embodiments, it is apparent that certain changes and modifications, in addition to those mentioned above, may be made. This patent covers all embodiments of the teachings of the disclosure that fairly fall within the scope of permissible equivalents. Accordingly, it is the intention to protect all variations and modifications that may occur to one of ordinary skill in the art.

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one implementation," "one embodiment," "an implementation," or "an embodiment" means that a particular element, feature, structure, or characteristic described in connection with the implementation is included in at least one implementation. The appearances of the phrase "in one implementation" or "in one embodiment" in various places in the specification are not necessarily all referring to the same implementation.

Some implementations may be described using the expression "coupled" along with its derivatives. For example, some implementations may be described using the term "coupled" to indicate that two or more elements are in direct physical or electrical contact. The term "coupled," however, may also mean that two or more elements are not in direct contact with each other, but yet still co-operate or interact with each other. The implementations are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the implementations herein. This is done merely for convenience and to give a general sense of the invention. This description should be read to include one or at least one and the singular also includes the plural unless it is obvious that it is meant otherwise.

Moreover, the patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

The invention claimed is:

1. A rotary valve, comprising:
    a valve body defining a valve inlet, a valve outlet, and a control passage in fluid communication with the valve inlet and the valve outlet;
    a ball element disposed within the control passage via a valve stem to control fluid flow between the valve inlet and the valve outlet, the ball element including a body having an outer portion and a slot in the body and for receiving the valve stem operatively coupled to an actuator by an actuator shaft, the slot disposed orthogonal to a lateral axis of the body when the ball element is in an open position, a bore disposed in a center portion of the body, and at least one brace disposed in the body between the bore and the outer portion of the ball element, the at least one brace includes at least one radial brace, each radial brace having a first portion extending directly to the bore and a second portion in contact with the outer portion of the ball element;
    a valve seat disposed in the control passage proximate to the valve inlet and sealingly engaging the ball element; and
    a valve seat holder for receiving the valve seat and a spring disposed upstream the valve seat holder, the spring in direct contact with the outer portion of the body of the ball element to bias the ball element in a closed position,
    wherein upon rotation of the ball element, the bore of the ball element is moveable from the closed position to an open position, in which the bore of the ball element is exposed to the control passage, allowing fluid flow through the bore.

2. The rotary valve of claim 1, wherein the at least one radial brace is a plurality of radial braces, each radial brace spaced equidistantly from each other around the bore.

3. The rotary valve of claim 1, wherein the at least one brace includes a plurality of braces including a first brace of the plurality of braces having a first thickness T1 and disposed between a slot for receiving a shaft and the bore, a second brace of the plurality of braces having a second thickness T2 and disposed between an aperture and the outer portion of the ball element, a third brace of the plurality of braces having a third thickness T3 and disposed between the aperture and the bore, and a fourth brace of the plurality of braces having a fourth thickness T4 and disposed between two apertures, wherein the first thickness T1 is greater than the second, third, and fourth thicknesses T2, T3, T4, and the fourth thickness T4 is greater than the second and third thicknesses T2, T3, resulting in the braces having various thicknesses around the ball element.

4. The rotary valve of claim 1, wherein the at least one brace includes at least one integral radial brace and the body of ball element has varying thicknesses around one or more of the slot, the outer portion of the ball, and the bore.

5. The rotary valve of claim 1, wherein the body of the ball element includes at least one area perpendicular to the bore that is thicker than other areas of the body.

6. The rotary valve of claim 1, wherein the at least one brace includes a plurality of braces, and each brace of the plurality of braces is disposed radially from the bore to the outer portion of the ball element.

7. The rotary valve of claim 1, wherein the at least one brace is disposed parallel to the bore.

8. The rotary valve of claim 7, wherein each of the at least one brace is spaced equidistantly from each other.

9. A method of manufacturing a ball element of a rotary valve, the method comprising:
    forming a body having an outer portion and a slot disposed in the body and for receiving a valve stem operatively coupled to an actuator by an actuator shaft, the slot disposed orthogonal to a lateral axis of the body when the ball element is in an open position, and the outer portion of the body of the ball element is in direct contact with a valve seat and a spring, biasing the ball element in a closed position, wherein the valve seat is disposed proximate to a valve inlet and the spring is disposed upstream of the valve seat;

applying a coating to the outer portion of the body during fabrication;

forming a bore disposed within the body; and forming at least one brace disposed between the body and the bore, the at least one brace disposed radially from the bore to the outer portion of the body, and the at least one brace includes a first portion extending directly to the bore and a second portion in contact with the outer portion of the body.

10. The method of claim 9, wherein forming at least one brace within the body comprises creating the at least one brace within the body using one or more of an additive manufacturing technique, a casting technique, or a sintering technique.

11. The method of claim 9, wherein forming one of the body, the bore, or the at least one brace comprises using an additive manufacturing technique with 3D printing, including using software stored on a memory of a computer and executed by a processor coupled to the memory.

12. The method of claim 9, wherein applying a coating to the outer portion of the body during fabrication comprises applying a coating to the outer portion of the body using an additive manufacturing technique.

13. The method of claim 9, wherein forming the body comprises creating the body using one of an additive manufacturing technique, a casting technique or a sintering technique.

14. The method of claim 13, wherein forming the bore within the body comprises creating the bore within the body using one or more of an additive manufacturing technique, a casting technique, or a sintering technique.

15. The method of claim 9, wherein forming one or more of the body, the bore and the at least one brace comprises forming one or more of the body, the bore and the at least one brace by one or more of casting or sintering and then joining one or more of the body, the bore and the at least one brace by fabrication.

16. The method of claim 15, wherein one or more of the body and the braces may be fabricated out of sheet, machined bar, or plate.

* * * * *

UNITED STATES PATENT AND TRADEMARK OFFICE
CERTIFICATE OF CORRECTION

PATENT NO. : 10,995,864 B2
APPLICATION NO. : 15/693657
DATED : May 4, 2021
INVENTOR(S) : Jason Dirk Jablonski Page 1 of 1

It is certified that error appears in the above-identified patent and that said Letters Patent is hereby corrected as shown below:

In the Specification

At Column 5, Line 20, "the same" should be -- are the same --.

At Column 5, Line 28, "include" should be -- includes --.

At Column 5, Line 65, "the same" should be -- are the same --.

At Column 6, Line 40, "second end 246" should be -- second end 256 --.

At Column 6, Line 53, "the same" should be -- are the same --.

At Column 7, Line 1, "bore 340" should be -- bore 342 --.

At Column 7, Line 33, "below" should be -- below. --.

At Column 8, Line 5, "the same" should be -- are the same --.

Signed and Sealed this
Second Day of November, 2021

Drew Hirshfeld
*Performing the Functions and Duties of the*
*Under Secretary of Commerce for Intellectual Property and*
*Director of the United States Patent and Trademark Office*